United States Patent
Miyabayashi

(10) Patent No.: US 6,653,367 B2
(45) Date of Patent: Nov. 25, 2003

(54) INK COMPOSITION CAPABLE OF REALIZING IMAGE POSSESSING EXCELLENT RUBBING/SCRATCH RESISTANCE

(75) Inventor: Toshiyuki Miyabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/782,530

(22) Filed: Feb. 13, 2001

(65) Prior Publication Data

US 2001/0023266 A1 Sep. 20, 2001

Related U.S. Application Data

(62) Division of application No. 09/149,737, filed on Sep. 8, 1998, now Pat. No. 6,204,307.

(30) Foreign Application Priority Data

Sep. 5, 1997 (JP) ................................ 9-241343
Apr. 10, 1998 (JP) ................................ 10-99011

(51) Int. Cl.$^7$ ................ C09D 11/10; B41J 2/01; C08L 25/04; C08L 33/02; C08L 33/04
(52) U.S. Cl. .............. 523/160; 523/161; 523/201; 347/100
(58) Field of Search ............... 523/160, 161, 523/201; 106/31.27, 31.28, 31.47, 31.49, 31.57; 347/100

(56) References Cited

U.S. PATENT DOCUMENTS

| | | | |
|---|---|---|---|
| 4,421,889 A | 12/1983 | Braun et al. ............... 524/381 |
| 4,445,124 A | 4/1984 | Fujii et al. ................. 347/89 |
| 4,824,485 A | 4/1989 | Tanaka et al. ........... 106/31.48 |
| 5,062,893 A * | 11/1991 | Adamic et al. ........... 106/31.52 |
| 5,075,364 A | 12/1991 | Phan et al. ............... 524/190 |
| 5,503,664 A | 4/1996 | Sano et al. ................. 524/27 |
| 5,611,847 A | 3/1997 | Gustina et al. ......... 106/31.43 |
| 5,631,309 A | 5/1997 | Yanagi et al. ............. 523/160 |
| 5,706,042 A * | 1/1998 | Takeyama et al. ........ 347/100 |
| 5,718,746 A * | 2/1998 | Nagasawa et al. ........ 106/31.9 |
| 5,769,930 A * | 6/1998 | Sano et al. ............. 106/31.36 |
| 5,814,685 A | 9/1998 | Satake et al. ............. 523/201 |
| 5,837,754 A * | 11/1998 | Shimomura et al. ....... 523/161 |
| 5,840,106 A | 11/1998 | Krepski et al. ......... 106/31.76 |
| 5,846,306 A | 12/1998 | Kubota et al. .......... 106/31.75 |
| 5,858,075 A | 1/1999 | Deardurff et al. ....... 106/31.27 |
| 5,882,389 A | 3/1999 | Schwarz, Jr. ........... 106/31.49 |
| 5,886,079 A | 3/1999 | Saibara et al. ............. 524/458 |
| 6,232,369 B1 * | 5/2001 | Ma et al. ................. 523/161 |
| 6,417,249 B1 * | 7/2002 | Nguyen et al. ........... 523/201 |

FOREIGN PATENT DOCUMENTS

| | | |
|---|---|---|
| EP | 0716931 | 6/1996 |
| EP | 0722994 | 7/1996 |
| EP | 0867484 | 9/1998 |
| JP | 55-157668 | 12/1980 |
| JP | 56-147859 | 11/1981 |
| JP | 56-147860 | 11/1981 |
| JP | 62-1426 | 1/1987 |
| JP | 1-217088 | 8/1989 |
| JP | 3-60068 | 3/1991 |
| JP | 3-240557 | 10/1991 |
| JP | 3-240558 | 10/1991 |
| JP | 4-5703 | 1/1992 |
| JP | 4-18462 | 1/1992 |
| JP | 6-106735 | 4/1994 |
| JP | 8188732 | 7/1996 |

OTHER PUBLICATIONS

Flory, Paul J.; Principles of Polymer Chemistry, Cornell University Press, Ithaca, p. 207 (1953).
Patent Abstracts of Japan of JP 08–188732 of Jul. 1996.

* cited by examiner

*Primary Examiner*—Callie Shosho
(74) *Attorney, Agent, or Firm*—Ladas and Parry

(57) ABSTRACT

An ink composition comprising a resin having a certain chelate structure can realize an image possessing excellent rubbing/scratch resistance and at the same time can realize various properties on a high level required of ink compositions. The ink composition comprises a colorant, water, a water-soluble organic solvent, and fine particles of a polymer, the polymer having a ligand structure capable of combining with a metal ion to form a chelate.

25 Claims, 6 Drawing Sheets

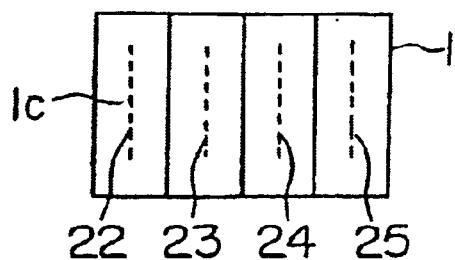
F I G. 2
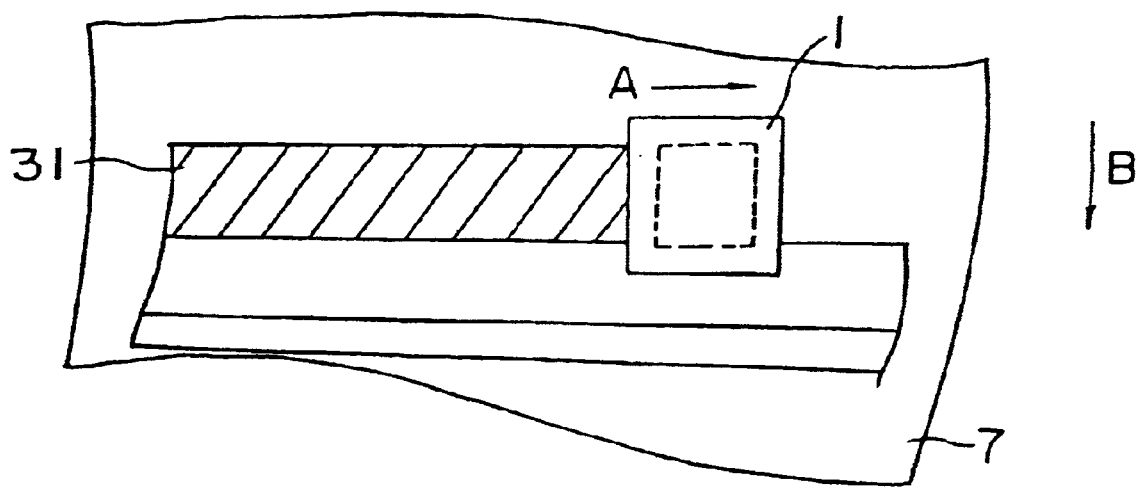
F I G. 3

INK COMPOSITION CAPABLE OF REALIZING IMAGE POSSESSING EXCELLENT RUBBING/SCRATCH RESISTANCE

This application is a divisional of copending application application Ser. No. 09/149,737 filed on Sep. 8, 1998 and now U.S. Pat. No. 6,204,307 and, claims the benefit thereof and incorporates the same by reference.

BACKGROUND OF THE INVENTION

1. Field of the Invention

The present invention relates to an ink composition, and more particularly to an ink composition that can be preferably used for ink jet recording.

2. Background Art

Ink jet recording is a printing method wherein droplets of an ink are ejected and deposited onto a recording medium, such as paper, to conduct printing. This method has a feature that an image having high resolution and quality can be printed at a high speed by means of a relatively inexpensive apparatus.

In general, the ink composition used in the ink jet recording comprises a water-soluble dye or a pigment, a water-soluble organic solvent, and water. One of properties required of the ink is to realize an image suffering from no significant feathering or bleeding. In particular, in multi-color printing, one color ink frequently comes into contact with another ink. Mixing of two inks of different colors on a recording medium, or the creation of bleeding on the recording medium yields an unfavorable color, resulting in a deterioration in resolution of the image, color separation, sharpness of edge, and color purity. Therefore, realizing an image having no significant feathering or bleeding is an important property required of the ink composition.

Further, in recent years, utilization of pigments as a colorant has been attempted. Pigments, as compared with dyes, possess superior waterfastness and lightfastness. Since, however, the pigment is left on a recording medium to form a pixel thereon, it has been often pointed out that the formed image has inferior rubbing/scratch resistance. Further, the pigment is essentially nonaqueous and hence should be stably dispersed in the ink composition. In order to stably disperse the pigment, several methods have been proposed wherein a resin is added to the ink composition. For example, Japanese Patent Publication No. 1426/1987 discloses an ink comprising a pigment and a resin emulsion dispersed in water, Japanese Patent Laid-Open No. 157668/1980 discloses a dispersion of a pigment in a water-insoluble, resin emulsion dispersion, Japanese Patent Laid-Open No. 217088/1989 discloses an ink using an emulsion having a specific film-forming temperature, Japanese Patent Laid-Open Nos. 60068/1991 and 18462/1992 likewise disclose an ink using a resin emulsion. Further, Japanese Patent Laid-Open Nos. 147859/1981 and 147860/1981 and Japanese Patent Publication No. 5703/1992 propose an aqueous dispersion type pigment ink using a polymeric dispersant and a water-soluble organic solvent. Unlike the dye which is penetrated into and fixed on a recording medium, the pigment is basically anchored and fixed onto the surface of the recording medium, often resulting in the formation of an image having poor rubbing/scratch resistance. In order to improve the fixability of the pigment onto the recording medium, addition of a resin component to the ink composition to strongly anchor the pigment onto the surface of the recording medium has been proposed in the art.

The addition of the resin to the pigment-based ink composition often leads to increased viscosity of the ink composition and, in some cases, renders the ink composition unsuitable for the ink jet recording. Further, the addition of the resin often develops such an unfavorable phenomenon that the properties of the ink composition are varied, causing the ink composition to wet a nozzle plate of an ink jet recording head. This has led to problems associated with ejection stability, such as inability of the ink composition to be ejected and ink droplet trajectory directionality. Further, the addition of the water-soluble resin to the ink often lowers the waterfastness of the yielded image or nozzle clogging of the recording head due to an increase in viscosity of the ink composition as a result of vaporization of water.

On the other hand, a new ink jet recording method has been recently proposed which comprises applying a polyvalent metal salt solution onto a recording medium and then applying an ink composition containing a dye having at least one carboxyl group (for example, Japanese Patent Laid-Open No. 202328/1993). According to this method, polyvalent metal ions combine with the dye to form an insoluble composite which can provide a high-quality image having waterfastness and free from color bleeding (for example, Japanese Patent Laid-Open No. 106735/1994).

Further, an ink jet recording method has been proposed wherein a color ink containing a surfactant or a penetrable solvent and a salt for imparting a penetrating property is used in combination with a black ink which cooperates with the salt to cause thickening or agglomeration, thereby providing a high-quality color image having high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open No. 240557/1991 and No. 240558/1991.

In the above ink jet recording methods wherein two liquids are printed, a further improvement in properties has been desired in the art. One of the properties to be further improved is fixability of the colorant. Ink jet recording, plain papers and recycled papers are in many cases used in addition to specialty recording media. For many of these recording media, ink is likely to penetrate in the recording medium. For this reason, even though a high-quality image is formed on a certain medium, feathering or color bleeding is often created on other media. A reduction in this problem has been desired in the art. Secondly, a reduction in uneven printing is required. The uneven printing refers to a variation in color density in the print derived from localization of a colorant on the paper. Although the uneven printing poses no significant problem in printing of letters of regular size, it is a serious problem in applications where figures, graphs and the like should be printed.

SUMMARY OF THE INVENTION

The present inventors have now found that an ink composition comprising a resin having a certain chelate structure can realize an image possessing excellent rubbing/scratch resistance and at the same time can realize various properties on a high level required of ink compositions. The present invention has been made based on such finding.

Accordingly, an object of the present invention is to provide an ink composition that can realize an image possessing excellent rubbing/scratch resistance.

Another object of the present invention is to provide an ink composition that can realize various properties on a high level required of ink compositions used in ink jet recording, such as stability against clogging, ejection stability, and storage stability.

A still another object of the present invention is to provide an ink jet recording method involving printing of two liquids that can realize a high-quality image.

The ink composition according to the present invention comprises a colorant, water, a water-soluble organic solvent; and fine particles of a polymer, the fine particles comprising a polymer having a ligand structure capable of combining with a metal ion to form a chelate.

The ink jet recording method using two liquids according to the present invention comprises the step of depositing the above ink composition and a reactant-containing reaction solution, capable of forming an agglomerate upon contact with the ink composition, to form an image.

BRIEF DESCRIPTION OF THE DRAWINGS

FIG. 2 is an enlarged view showing the surface of nozzles for a recording head, wherein reference character 1c designates the surface of a plurality of nozzles, arranged in longitudinal direction, through which an ink composition is ejected;

FIG. 3 is a diagram illustrating ink jet recording using the recording head shown in FIG. 2, wherein numeral 31 designates an ink composition printed region;

DETAILED DESCRIPTION OF THE INVENTION

1. Ink Composition

Figure 1:
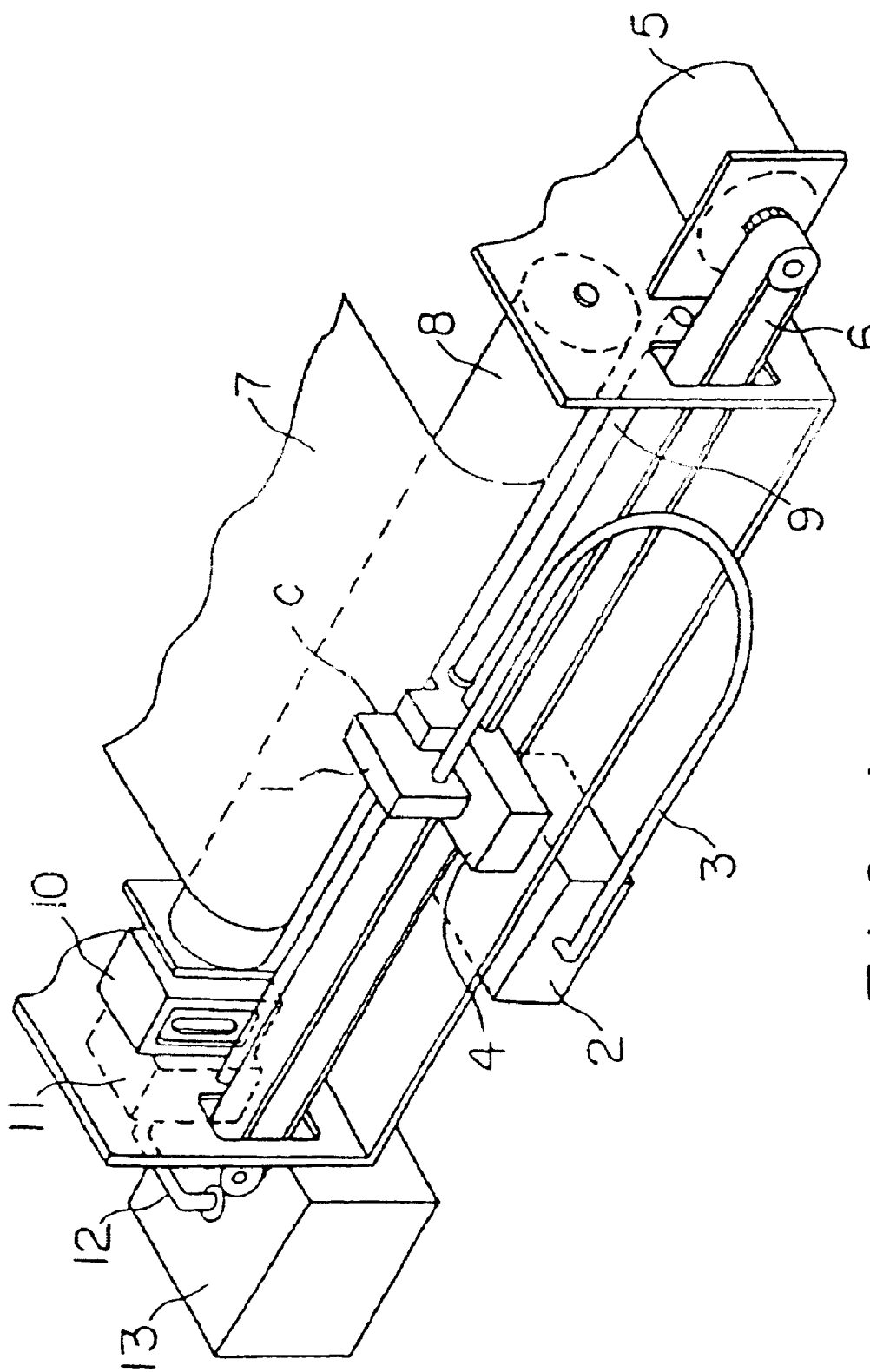
FIG. 1 is a diagram showing an ink jet recording apparatus usable in practicing the method according to the present invention, wherein a recording head is provided separately from an ink tank and an ink composition is fed into the recording head through an ink tube.

The ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

The ink composition according to the present invention basically comprises a colorant, water, a water-soluble organic solvent, and fine particles of a polymer, the fine particles comprising a polymer having a ligand structure capable of combining with a metal ion to form a chelate.

2. Fine Particles of Polymer

According to the present invention, the ligand structure, of the fine particles of the polymer, capable of combining with a metal ion to form a chelate is a structure that has a plurality of atoms for supplying electron capable of forming a coordination bond, the plurality of atoms being present at suitable intervals to permit the plurality of atoms to sandwich the metal ion therebetween, thereby forming a metal chelate compound.

According to a preferred embodiment of the present invention, preferred embodiments of such ligand structures include a β-diketone structure, a polyamine structure, an iminodiacetic acid structure, a sarcosine structure, an ethanolamino acid structure, a glycine structure, a xanthogenic acid structure, an amidoxime structure, an amine structure, a pyridine structure, an imidazole structure, a phosphonic acid structure, a phosphinic acid structure, a phosphoric acid structure, a Schiff base structure, an oxime structure, a hydroxame structure, an aminopolycarboxylic acid structure, a thiol structure, and a polythioalcohol structure, a 2-pyrrolidone structure, and a 2-oxazolidone structure.

According to a specific embodiment of the present invention, an example of the ligand structure capable of combining with the metal ion to form a chelate is a structure represented by the following formula:

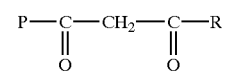

wherein P represents a polymer structure moiety and R represents an alkyl group, preferably a $C_{1-20}$ alkyl group, more preferably a $C_{1-10}$ alkyl group, most preferably a methyl group, or an aryl group, for example, phenyl, naphthyl, or tolyl.

Metal chelate structures formed by cooperation of the above ligand structure with, for example, a divalent metal are considered as follows:

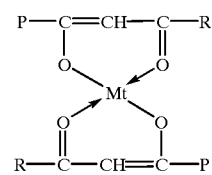

wherein Mt represents a divalent metal; and L, P, and R are as defined above.

The ink composition comprising the above fine particles of the polymer is considered to yield a good image through the following mechanism. The above mechanism, however, is merely hypothetical and is not intended to limit the present invention.

Upon deposition of the ink composition onto the surface of a recording medium, the solvent component penetrates into the recording medium or evaporates, permitting the colorant and the fine particles of the polymer to be fixed onto the recording medium. In this case, as soon as the ligand structure of the fine particles combines with the metal ion present on the surface of the recording medium to form a chelate, the colorant and the fine particles of the polymer agglomerate quickly. As a result, the colorant and the fine particles of the polymer are left on the surface of the recording medium and strongly anchored onto the surface of the recording medium to yield an image having good rubbing/scratch resistance.

More specifically, when the colorant is a dye, the dye, together with the solvent component, is penetrated into the recording medium to some extent and is fixed onto the recording medium. Provision of a layer formed of the fine particles thereon results in improved rubbing/scratch resistance. On the other hand, when the colorant is a pigment, the molecule per se, other than the ligand structure, of the fine particles promotes the fixation of the pigment onto the surface of the recording medium. Further, in this case, the ligand structure of the fine particles combines with a metal ion present on the surface of the recording medium to form a chelate which serves to more strongly anchor the pigment onto the recording medium.

According to a preferred embodiment of the present invention, which will be described later, when the fine particles of the polymer has a film-forming property, the polymer, which has been brought to a film, advantageously serves to more strongly anchor the colorant on the surface of the recording medium. According to this embodiment, in particular, a good image can be realized independently of the type of the recording medium. More specifically, a good image can be realized on specialty papers, as well as on pain papers, recycled papers and the like.

According to a preferred embodiment of the present invention, the diameter of the fine particles is about not more than 0.4 µm, more preferably about 0.005 to 0.3 µm.

The content of the fine particles in the ink composition according to the present invention is preferably about 1 to 10% by weight, more preferably 1 to 5% by weight, based on the ink composition.

According to a preferred embodiment of the present invention, the fine particle of the polymer has a homogeneous particle structure. According to another preferred embodiment of the present invention, the fine particle of the polymer has a core/shell structure comprising a core surrounded by a shell.

According to a preferred embodiment of the present invention, the fine particles of the polymer are present, as dispersed particles of a polymer emulsion, in the ink composition. Specifically, in the preparation of the ink composition of the present invention, preferably, the fine particles of the polymer are mixed in the form of a polymer emulsion with ingredients of the ink composition. According to a preferred embodiment of the present invention, the diameter of the fine particles in the polymer emulsion is about not more than about 0.4 µm, more preferably about 0.005 to 0.3 µm.

According to a preferred embodiment of the present invention, the polymer constituting the fine particles has a glass transition point of 30° C. or below. Use of this polymer enables the ink composition of the present invention to more surely form a film at room temperature.

According to a preferred embodiment of the present invention, when the fine particles of the polymer are present, in the ink composition, as dispersed particles of a polymer emulsion, the minimum film-forming temperature of the polymer emulsion is 30° C. or below. In this case, the term "minimum film-forming temperature" used herein refers to a minimum temperature at which, when the polymer emulsion is thinly cast onto a sheet of a metal, such as aluminum, to form a coating which is then gradually heated, a transparent, continuous film is formed. In a temperature region below the minimum film-forming temperature, a white powder is formed. That is, the boundary temperature, at which the form of the polymer changes from a transparent, continuous film to a white powder, is regarded as the minimum film-forming temperature. This embodiment can improve fast drying, drying to the touch, rubbing/scratch resistance, and waterfastness of prints.

As the ink composition deposits on the recording medium and, in addition, the amounts of water and the water-soluble organic solvent around the fine particles of the polymer are reduced as a result of penetration into the recording medium, the fines particles of the polymer having the film-forming property coalesce with and fused to one another to form a film including the colorant. Therefore, the formed image is excellent in rubbing/scratch resistance, as well as in waterfastness. When the colorant is a dye, it is considered that a part of the dye is penetrated into the recording medium and the fine particles of the polymer are left on the surface of the recording medium while incorporating a part of the dye, thereby forming a film. This film is considered to offer good rubbing/scratch resistance and waterfastness.

According to a preferred embodiment of the present invention, the fine particles of the polymer comprise a thermoplastic polymer. The polymer may be a crosslinked one. Examples of thermoplastic polymers usable herein include, but are not limited to, poly(meth)acrylic esters, polystyrene, (meth)acrylic ester/styrene copolymers, polyvinyl acetate, ethylene/vinyl acetate copolymers, ethylene/(meth)acrylic ester copolymers, polybutadiene, polyisoprene, polyvinyl chloride, polyvinylidene chloride, poly(α-methylstyrene), styrene/butadiene copolymers, (meth)acrylic acid/styrene copolymers, styrene/maleic acid copolymers, styrene/itaconic acid copolymers, styrene/maleic ester copolymers, styrene/itaconic ester copolymers, polyesters, polyurethane, polysiloxane, and polyamides.

The fine particles of the polymer used in the present invention may be produced as follows. Specifically, a monomer having a ligand structure and another monomer may be produced by a suitable polymerization method, for example, by emulsion polymerization in the presence of a polymerization catalyst and an emulsifier. Alternatively, a monomer, which, although it has a functional group, does not have a ligand structure, may be polymerized, by a suitable polymerization method, for example, by emulsion polymerization, followed by introduction of a ligand structure into the functional group.

More specifically, the fine particles of the polymer used in the present invention may be produced by conventional emulsion polymerization. Specifically, a monomer component having a ligand structure and another monomer component may be emulsion polymerized in water in the presence of a polymerization catalyst and an emulsifier. Emulsifiers usable herein include anionic surfactants, nonionic surfactants, and mixtures thereof. Anionic surfactants usable herein include salts of alkylsulfonic acids, alkylsulfone sulfates, salts of alkylbenzenesulfonic acids, salts of alkylnaphthalenesulfonic acids, alkylbenzenesulfone sulfates, salts of dialkylsulfosuccinic acid, salts of fatty acids, polyoxyethylene alkyl ether sulfates, and polyoxyethylene phenyl ether sulfates. Nonionic surfactants usable herein include polyoxyethylene alkyl ethers, polyoxyethylene alkylphenyl ethers, polyoxyethylene-polystyrylphenyl ether, polyoxyethylene-polyoxypropylene glycol, polyoxyethylene-polyoxypropylene alkyl ethers, polyoxyethylene fatty acid esters, and polyglycerin fatty acid esters. The emulsion polymerization is preferred for the production of fine particles of a polymer in the form of a polymer emulsion. According to a preferred embodiment of the present invention, utilization of a surfactant having an HLB of 15 to 20 is preferred from the viewpoint of producing a stable polymer emulsion.

The monomer component used in the above production method is not particularly limited so far as it can provide the polymer component of the fine particles. Specific examples thereof include: vinyl esters, for example, acrylic esters or methacrylic esters, such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-hydroxyethyl (meth)acrylate, 2-hydroxypropyl (meth)acrylate, glycidyl methacrylate, and glycidyl acrylate, and vinyl acetate; acrylonitrile, methacrylonitrile and the like; aromatic vinyl compounds, such as styrene, 2-methylstyrene, vinyltoluene, t-butylstyrene, chlorostyrene, vinylanisole, vinylnaphthalene, and divinylbenzene; halogenated vinylidene, such as vinylidene chloride and vinylidene fluoride; ethylene, propylene, isopropylene, butadiene, vinylpyrrolidone, vinyl chloride, vinyl ether, vinyl ketone, chloroprene and the like, and carboxyl-containing compounds, for example, ethylenically unsaturated carboxylic acids, such as acrylic acid, methacrylic acid, maleic acid, or monoalkyl esters thereof, itaconic acid or monoalkyl esters thereof, fumaric acid or monoalkyl esters thereof; amido-containing compounds, such as acrylamide and N,N-dimethylacrylamide, and alkylamino esters of acrylic acid or methacrylic acid, for example, amino-containing compounds, such as N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate; unsaturated amides containing an alkylamino group, such as N-(2-dimethylaminoethyl) acrylamide, N-(2-dimethylaminoethyl)methacrylamide, and N,N-dimethylaminopropylacrylamide, monovinylpyridines, such as vinylpyridine, and vinyl ethers containing an alkylamino group, such as dimethylaminoethyl vinyl ether; and vinylimidazole and the like and compounds containing a sulfonic group, such as vinylsulfonic acid, styrenesulfonic acid and salts thereof and 2-acryloylamino-2-methylpropanesulfonic acid and salts thereof. These monomers may be used alone or as a mixture of two or more.

As described above, the fine particles of the polymer may have either a homologeneous structure or a core/shell structure.

The fine particle of the polymer having a core/shell structure may be produced by any conventional method without particular limitation. For example, in general, it may be produced by multi-stage emulsion polymerization.

When the fine particle has a core/shell structure, preferably, the ligand structure is present in the shell layer.

According to a preferred embodiment of the present invention, the fine particle of the polymer, independently of whether it has a homogeneous structure or a core/shell structure, has a carboxyl group or a sulfonic group as a functional group and further preferably has an amido group, a hydroxyl group, or an amino group. In the case of the core/shell structure, the presence of the above functional groups in the shell layer is preferred. These groups may be allowed to exist in the structure of the monomer in the above production method. Alternatively, after the fine particles of the polymer are produced, the groups may be added onto the surface thereof by graft polymerization or the like. The presence of the groups is considered preferable from the viewpoint of the following expected mechanism. However, it should be noted that the following theory is merely hypothetical and the present invention is not limited to the theory. Hydrophilic groups, such as carboxyl, sulfonic, amido, amino, and hydroxyl groups, present on the surface of the polymer particles are bonded to a hydroxyl group (an OH group) of cellulose constituting paper fibers by hydrogen bonding, permitting the fine particles of the polymer to be strongly adsorbed onto the paper fibers. This inhibits penetration of a colorant, such as a pigment, into the paper. In particular, when the fine particle of the polymer has a core/shell structure with a hydrophilic group, such as a carboxyl, sulfonic, amido, amino, or hydroxyl group, being contained in the shell layer, the proportion of the hydrophilic group present on the surface of the fine particles is increased, offering better effect. Water and the water-soluble organic solvent around the fine particles of the polymer adsorbed onto the paper fibers penetrate the interior of the paper, and, hence, the amount thereof is reduced. This results in coalescence and fusing of fine particles of the polymer to form a film with the colorant, such as a pigment, incorporated therein. The ink composition containing the fine particles having these groups does not wet the surface of a nozzle plate, which has been subjected to water repellency-imparting treatment, in a recording head of an ink jet printer. As a result, the ink composition can be highly stably ejected without causing a failure of the nozzle to eject the ink or an ink droplet trajectory directionality problem attributable to wetting of the surface of the nozzle plate by the ink composition. Further, the ink composition containing the fine particles having the above groups has excellent storage stability.

3. Colorant

The colorant contained in the ink composition according to the present invention may be either a dye or a pigment with the pigment being preferred.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

In particular, carbon blacks usable for black inks include, but are not limited to: No. 2300, No. 900, MCF 88, No. 33, No.40, No.45, No.52, MA7, MA8, MA100, No. 2200B and the like, manufactured by Mitsubishi Chemical Corporation; Raven 5750, Raven 5250, Raven 5000, Raven 3500, Raven 1255; Raven 700 and the like, manufactured by Columbian Carbon Co., Ltd.; Regal 400R, Regal 330R, Rega 1660R, Mogul L, Monarch 700, Monarch 800, Monarch 880, Monarch 900, Monarch 1000, Monarch 1100, Monarch 1300, Monarch 1400 and the like, manufactured by Cabot Corporation; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4, manufactured by Degussa. Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154. Pigments usable for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 123, C.I. Pigment Red 168, C.I. Pigment Red 184, and C.I. Pigment Red 202. Pigments usable for cyan inks include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4, and C.I. Vat Blue 60.

The particle diameter of the pigment is preferably not more than 10 $\mu$m, more preferably not more than 0.1 $\mu$m.

According to a preferred embodiment of the present invention, the above pigment is added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, a polymeric dispersant. In this connection, that the dispersant and the surfactant contained in the dispersion of the pigment function also as the dispersant and the surfactant for the ink composition will be apparent to a person having ordinary skill in the art. Preferred examples of polymeric dispersants usable herein include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methyl cellulose, carboxymethyl cellulose, hydroxyethyl cellulose, and ethylhydroxy cellulose. Preferred polymeric dispersants usable herein include synthetic polymers, and examples thereof include polyvinyl alcohols, polyvinyl pyrrolidones, acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer, styrene/acrylic resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer, styrene/maleic acid copolymer, styrene/maleic anhydride copolymer, vinylnaphthalene/acrylic acid copolymer, vinylnaphthalene/maleic acid copolymer, and vinyl acetate copolymers, such as vinyl acetate/ethylene copolymer, vinyl acetate/fatty acid/ethylene copolymer, vinyl acetate/maleic ester copolymer, vinyl acetate/crotonic acid copolymer, and vinyl acetate/acrylic acid copolymer, and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred.

The content of the pigment in the ink composition according to the present invention is preferably about 0.5 to 25% by weight, more preferably about 2 to 15% by weight.

4. Water-Soluble Organic Solvent

The ink composition of the present invention comprises a water-soluble organic solvent. The water-soluble organic solvent is preferably a low-boiling organic solvent, and examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably in the range of from 0.1 to 30% by weight, more preferably in the range of from 5 to 10% by weight, based on the ink.

According to a preferred embodiment of the present invention, the ink composition of the present invention further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone.

The amount of the wetting agent added is preferably in the range of from 0.1 to 30% by weight, more preferably in the range of from 1 to 10% by weight, based on the ink.

According to a preferred embodiment of the present invention, when the glass transition point of the fine particles is 30° C. or below or when the minimum film-forming temperature of the polymer emulsion is 30° C. or below, use of a water-soluble organic solvent having a boiling point of 180° C. or above is preferred. Preferred examples of water-soluble organic solvents having a boiling point of 180° C. or above usable herein include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). According to a preferred embodiment of the present invention, a solvent selected from, for example, ethylene glycol, diethylene glycol, pentamethylene glycol, trimethylene glycol, 2-butene-1,4-diol, 2-ethyl-1,3-hexanediol, 2-methyl-2,4-pentanediol, glycerin, dipropylene glycol, tetraethylene glycol, triethylene glycol, N-methyl-2-pyrrolidone, 1,3-dimethyl-2-imidazolidinone, and 2-pyrrolidone, is used as the high-boiling, water-soluble solvent.

According to a preferred embodiment of the present invention, the ink composition contains a saccharide, a tertiary amine, an alkali hydroxide, or ammonia. Addition of these compounds can provide an ink composition which causes neither agglomeration of the colorant nor an increase in viscosity of the ink even after storage for a long period of time, that is, possesses excellent storage stability, and, even when allowed to stand in an open state (that is, a state of contact with air at room temperature), can maintain the fluidity and the redispersibility for a long period of time, and, in addition, does not cause clogging of nozzles during printing or at the time of restarting after interruption of printing, thus offering high ejection stability.

Saccharides, which may be added to the ink composition of the present invention, include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbitol, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the saccharide is preferably 0.1 to 40% by weight, more preferably 1 to 30% by weight, based on the ink.

Tertiary amines, which may be added to the ink composition of the present invention, include trimethylamine, triethylamine, triethanolamine, dimethylethanolamine, diethylethanolamine, triisopropenolamine, and butyldiethanolamine. They may be used alone or in combination. The amount of the tertiary amine added to the ink composition of the present invention is preferably 0.1 to 10% by weight, more preferably 0.5 to 5% by weight.

Alkali hydroxides, which may be added to the ink composition of the present invention, include potassium hydroxide, sodium hydroxide, and lithium hydroxide, and the amount of the alkali hydroxide added to the ink composition of the present invention is preferably 0.01 to 5% by weight, more preferably 0.05 to 3% by weight.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycol (OLFINE Y and Surfynol 82, 104, 440, 465, and 485 (all the above products being manufactured by Air Products and Chemicals Inc.). They may be used alone or in combination of two or more.

The ink composition of the present invention may contain fine particles of a general-purpose polymer in addition to the fine particles of the polymer. Preferably, the general-purpose polymer is in the form of a polymer emulsion. Fine particles of general-purpose polymers usable herein include fine particles of an acrylic polymer, a vinyl acetate polymer, a styrene/butadiene copolymer, a vinyl chloride polymer, a (meth)acrylate/styrene copolymer, a butadiene polymer, and a styrenic polymer. The diameter of the fine particles of the general-purpose polymer is preferably not more than about 0.4 μm, more preferably about 0.005 to 0.3 μm. The fine particles of the polymer may be one which is commercially available as a polymer emulsion, and examples thereof include Microgel E-1002 and E-5002 (styrene/acrylic polymer emulsion, manufactured by Nippon Paint Co., Ltd.), Voncoat 4001 (acrylic polymer emulsion, manufactured by Dainippon Ink and Chemicals, Inc.), Voncoat 5454 (styrene/acrylic polymer emulsion, manufactured by Dainippon Ink and Chemicals, Inc.), SAE-1014 (styrene/acrylic polymer emulsion, manufactured by Nippon Zeon Co., Ltd.), and Saivinol SK-200 (acrylic polymer emulsion, manufactured by Saiden Chemical Industry Co., Ltd).

If necessary, pH adjusters, preservatives, antimolds, phosphorus antioxidants and the like may be added to the ink composition.

5. Water-Soluble Sequestering Agent

According to a preferred embodiment of the present invention, the ink composition according to the present invention contains a sequestering agent. The term "water-soluble sequestering agent" used herein include an agent that can rapidly combine with a divalent or higher metal ion to form a stable, water-soluble chelate.

Addition of the sequestering agent can improve the storage stability of the ink composition and can effectively prevent nozzle clogging. The reason for this is considered as follows. Specifically, the sequestering agent captures a polyvalent metal ion present, in the ink composition, as an impurity derived from the colorant, water, the water-soluble organic solvent. This can effectively prevent the fine particles of the polymer, having a ligand structure capable of combining with the metal ion to form a chelate, from being agglomerated by the metal ion contained in the ink composition. Therefore, preferably, addition of an excessive amount of the sequestering agent is avoided because it can eliminate the opportunity for the metal ion and the fine particles of the polymer present on the surface of the recording medium to react with each other, resulting in lowered agglomeration of the ink composition. According to a preferred embodiment of the present invention, the amount of the water-soluble sequestering agent added is 0.0001 to 5% by weight, more preferably 0.01 to 1% by weight.

According to a preferred embodiment of the present invention, in the production of the ink composition, the sequestering agent is mixed with other ingredients prior to the addition of the fine particles. This can effectively capture the metal ion as the impurity.

Examples of water-soluble sequestering agents used in the present invention include those selected from the group consisting of ethylenediaminetetraacetic acid, iminodiacetic acid, nitriloacetic acid, diethylenetriaminepentaacetic acid, triethylenetetraminehexaacetic acid, cyclohexane-1,2-diaminetetraaceticacid, N-hydroxyethylethylenediaminetriacetic acid, ethylene glycol diethyl ether amine tetraacetic acid, ethylenediaminetetrapropionic acid, pyrophosphoric acid, and triphosphoric acid.

6. Production of Ink Composition

The ink composition according to the present invention can be prepared by dispersing and mixing the above components using a suitable method. Preferably, the pigment, the polymeric dispersant, and water are first mixed together by means of a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Subsequently, a water-soluble organic solvent having a boiling point of 180° C. or above, a saccharide, a pH adjustor, a preservative, an antimold and the like are added to and satisfactorily dissolved in water, and a polymer emulsion comprising the fine particles of the polymer as dispersed particles is added thereto, followed by thorough stirring at room temperature by means of a suitable dispergator to prepare an ink solvent. The ink solvent is gradually added dropwise to the pigment dispersion with stirring by means of a suitable dispergator, followed by further thorough stirring. After thorough stirring, coarse particles and foreign matter causative of nozzle clogging are removed by filtration to prepare a contemplated ink composition.

As described above, preferably, the sequestering agent may be mixed with other components prior to the addition of the fine particles of the polymer.

7. Ink Jet Recording Method

The ink composition of the present invention is preferably used for ink jet recording. Further, the ink composition of the present invention may be preferably used for color ink jet recording using a plurality of color ink compositions. The color ink jet recording will be described with reference to the accompanying drawings.

FIG. 1 is a diagram showing an embodiment of an ink jet recording apparatus. In this embodiment, an ink composition is stored in a tank and fed into a recording head through an ink tube. Specifically, a recording head 1 with a nozzles on surface 1c is communicated with an ink tank 2 through an ink tube 3. In this case, the interior of the ink tank 2 is partitioned, and a chamber for an ink composition, optionally a plurality of chambers respectively for a plurality of color ink compositions, are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The sucked ink composition is resorvoired in a waste ink tank 13 through a tube 12.

FIG. 2 is an enlarged view showing the surface of nozzles for the recording head 1. In the drawing, the surface of nozzles for the ink composition is indicated by 1c, and a yellow ink composition, a magenta ink composition, a cyan ink composition, and a black ink composition are ejected respectively through nozzles 22, 23, 24 and 25.

Further, an ink jet recording method using the recording head shown in FIG. 2 will be described with reference to FIG. 3. The recording head 1 is moved in the direction indicated by an arrow A, during which time the ink composition is printed to form a print region 31.

In the ink jet recording apparatus, the supplement of the ink composition may be carried out by replacing an ink tank in a cartridge form. The ink tank may be integral with the recording head.

Figure 4:
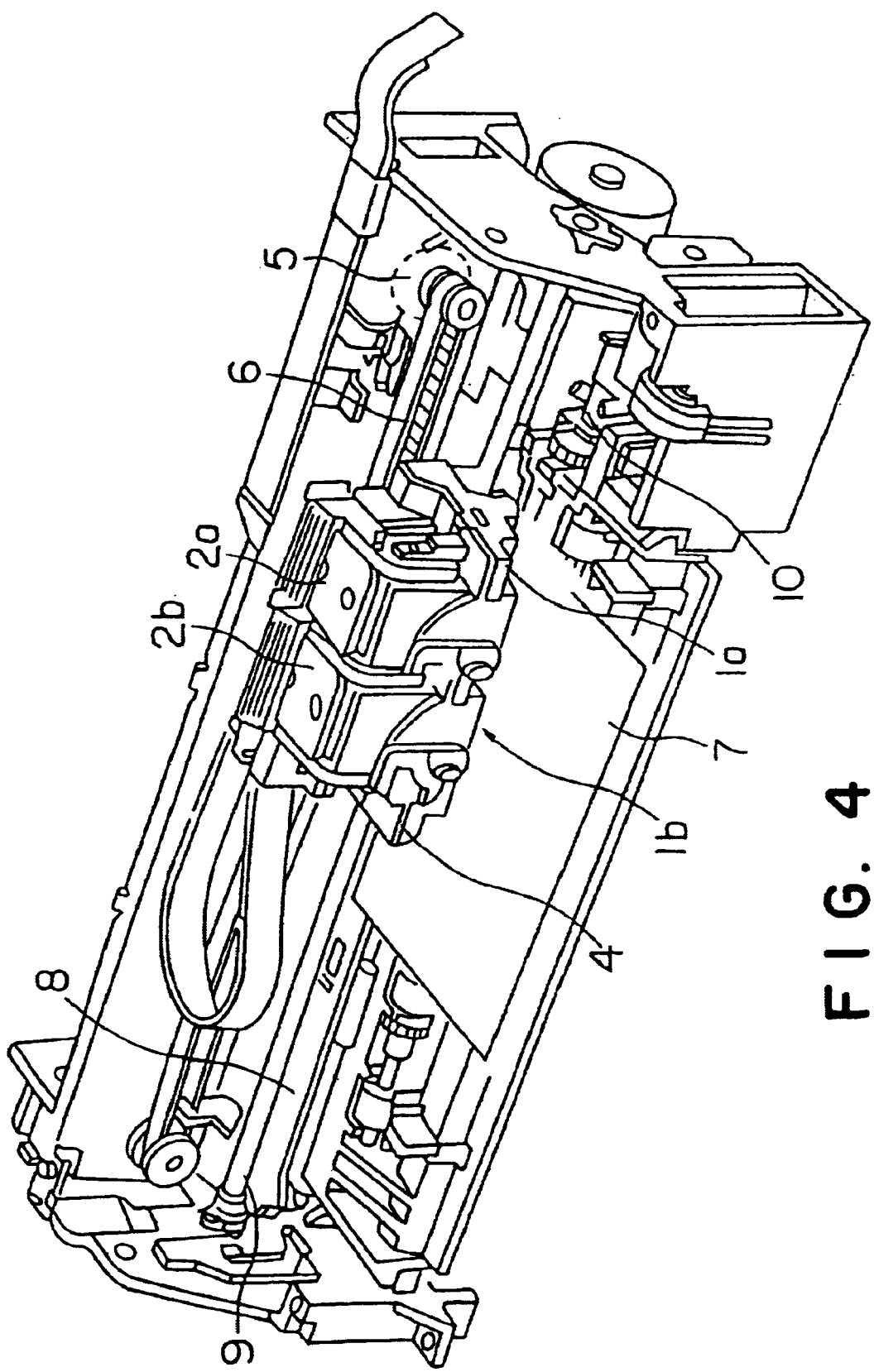
FIG. 4 is a diagram showing an ink jet recording apparatus usable in practicing the method according to the present invention, wherein a recording head is integral with an ink tank.

A preferred embodiment of an ink jet recording apparatus using such an ink tank is shown in FIG. 4. In the drawing, the same members as used in the apparatus shown in FIG. 1 have the same reference numerals. In the embodiment shown in FIG. 4, a recording head 1a is integral with an ink tank 2a and a recording head 1b is integral with an ink tank 2b. Basically, printing may be conducted in the same manner as described above in connection with the apparatus shown in FIG. 1. Further, in this embodiment, the recording head 1 is moved together with the ink tank 2 on a carriage 4.

8. Recording Method Using Two Liquids

According to a preferred embodiment of the present invention, the ink composition is used for a recording method using two liquids, that is, an ink composition and a reaction solution comprising a reactant which produces an agglomerate upon contact with the ink composition. This method can produce an image having excellent fixation, drying to touch, rubbing/scratch resistance, and waterfastness and good OD value and glossiness. The reason for this is believed to reside in that the reactant breaks the state of dispersion of the colorant and the polymer emulsion to create an agglomerate, thereby realizing a high-quality image which has good fixation to recording media, such as paper, and high OD value and glossiness and is free from feathering or color bleeding.

Examples of reactants which produce an agglomerate upon contact with the ink composition of the present invention include polyvalent metal salts and/or polyallylamine and/or derivatives thereof. In particular, the polyvalent metal ion derived from the polyvalent metal salt combines with the ligand structure of the fine particles of the polymer to form a chelate structure which quickly breaks the dispersed state of the fine particles of the polymer, accelerating the formation of the agglomerate. As a result, the penetration of the colorant into the recording medium is inhibited, realizing an image suffering from no significant feathering or color bleeding. As described above, a part of the ligand structure combines with the metal ion present on the recording medium to form a chelate which serves to strongly anchor the colorant onto the surface of the recording medium. Although the polyallylamine or derivative thereof as a reactant does not react directly with the ligand structure of the fine particles, it functions to quickly break the dispersed state of the fine particles of the polymer, accelerating the formation of an agglomerate. Further, the ligand structure of the fine particles of the polymer is strongly bonded to the metal ion present on the recording medium. Therefore, even when the polyallylamine or derivative thereof as the reactant is used, an image can be realized which suffers from no significant feathering or bleeding and possesses excellent scratch resistance.

Examples of polyvalent metal salts usable herein include salts which are constituted by divalent or higher polyvalent metallic ions and anions bonded to the polyvalent metallic ions and are soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Specific examples of anions include $Cl^-$, $NO_3^-$, $I^-$, $Br^-$, $ClO_3^-$, and $CH_3COO^-$. Preferred are nitrate and carboxylate ions. In this case, preferably, the carboxylate ions are derived from a carboxylic acid selected from the group consisting of a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, isobutyric acid, valeric acid, isovaleric acid, pivalic acid, and hexanoic acid. Among them, formic acid and acetic acid are particularly preferred. A hydrogen atom(s) on the saturated aliphatic hydrocarbon residue in the monocarboxylic acid may be substituted by a hydroxyl group. Preferred examples of such carboxylic acids include benzoic acid and naphthoic acid with benzoic acid being more preferred.

The polyallylamine and polyallylamine derivative are cationic polymers that are soluble in water and can be positively charged in water. Such polymers include, for example, those represented by the following formulae (a), (b), and (c):

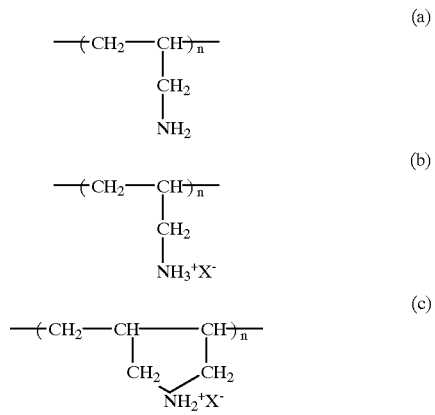

wherein $X^-$ represents chloride, bromide, iodide, nitrate, phosphate, sulfate, acetate or other ion.

In addition, a copolymer of an allylamine with a diallylamine and a copolymer of diallylmethylammonium chloride with sulfur dioxide may also be used.

The reaction solution used in the present invention basically comprises a polyvalent metal salt and/or polyallylamine and/or a polyallylamine derivative and water.

The concentration of the polyvalent metal salt in the reaction solution may be properly determined so that good print quality and the effect of preventing nozzle clogging can be attained. It is preferably about 0.1 to 40% by weight, more preferably about 5 to 25% by weight, based on the reaction solution. The concentration of polyallylamine and/or the polyallylamine derivative in the reaction solution is preferably 0.5 to 10% by weight based on the reaction solution.

Further, in the present invention, preferably, the reaction solution comprises a wetting agent, such as a high-boiling organic solvent. Preferred examples of high-boiling organic solvents usable herein include those described above in connection with the ink composition. The high-boiling organic solvent functions to prevent the reaction solution from drying out, thereby preventing clogging of the head.

Although the amount of the high-boiling organic solvent added is not particularly limited, it is preferably about 0.5 to 40% by weight, more preferably about 2 to 20% by weight.

According to a more preferred embodiment of the present invention, triethylene glycol monobutyl ether or glycerin is added as the high-boiling organic solvent. When triethylene glycol monobutyl ether and glycerin are added in combination, the amounts of triethylene glycol monobutyl ether and glycerin added are preferably about 10 to 20% by weight and about 1 to 15% by weight, respectively. Further, the above surfactant may be added to the reaction solution. In addition, if necessary, pH adjustors, such as ammonia, preservatives, antimolds and the like may be added to the reaction solution from the viewpoint of improving the storage stability.

The reaction solution may be colored by adding a color colorant so that the reaction solution can function also as an ink composition.

The reaction solution may be deposited onto the recording medium by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration.

According to a preferred embodiment of the present invention, the ink composition and the reaction solution are applied onto a recording medium by the so-called "ink jet recording." Specifically, preferably, an ink droplet is ejected through an ink ejecting hole of an ink jet recording head and deposited on a recording medium to form an image thereon.

The ink jet recording method using the ink composition and the reaction solution according to the present invention will be described in more detail with reference to the accompanying drawings.

Figure 5:
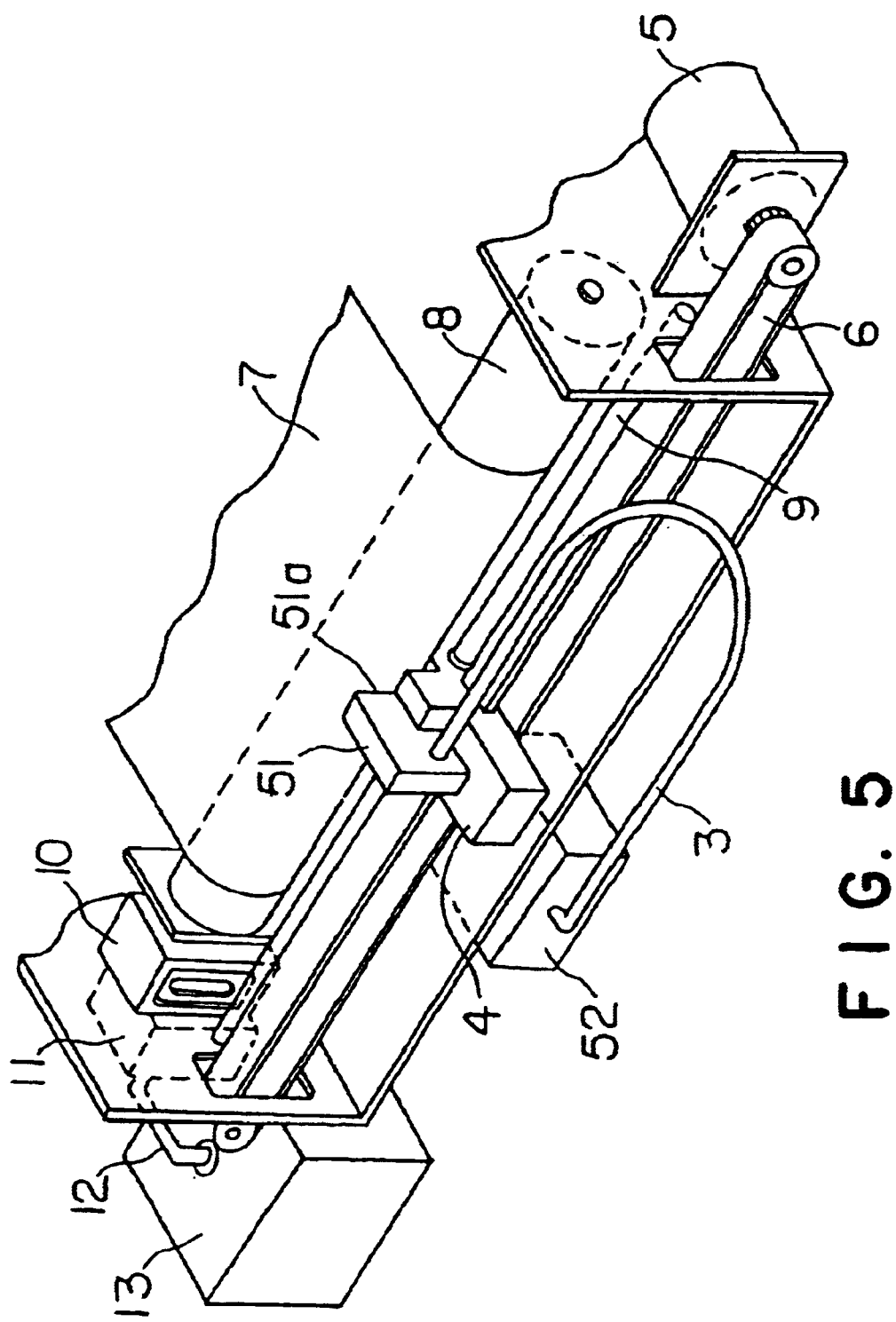
FIG. 5 is a diagram showing an ink jet recording apparatus usable in practicing the method according to the present invention, wherein a recording head is provided separately from an ink tank and an ink composition and a reaction solution are fed into the recording head through an ink tube.

FIG. 5 is a diagram showing an embodiment of an ink jet recording apparatus. In this embodiment, an ink composition and a reaction solution are accommodated in a tank and fed into a recording head through an ink tube. Specifically, a recording head 51 is communicated with an ink tank 52 through an ink tube 3. In this case, the interior of the ink tank 52 is partitioned, and a chamber for an ink composition, optionally a plurality of chambers respectively for a plurality of color ink compositions, and a chamber for a reaction solution are provided.

The recording head 51 is moved along a carriage 4 by means of a timing belt 6 driven by a motor 5. On the other hand, paper 7 as a recording medium is placed by a platen 8 and a guide 9 at a position facing the recording head 51. In this embodiment, a cap 10 is provided. A suction pump 11 is connected to the cap 10 in order to conduct the so-called "cleaning operation." The ink composition sucked by the suction pump 11 is resorvoired in a waste ink tank 13 through a tube 12.

Figure 6:
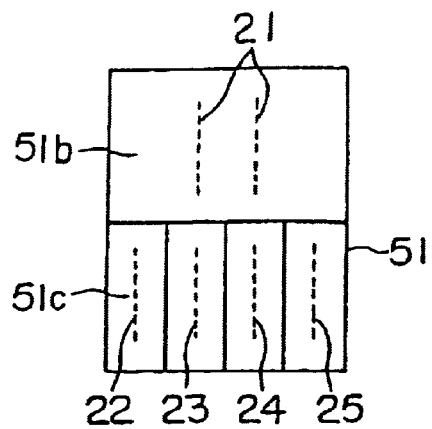
FIG. 6 is an enlarged view of the surface of nozzles for a recording head, wherein reference character 51b designates the surface of a nozzle for a reaction solution and reference character 51c the surface of a nozzle for an ink composition.

FIG. 6 is an enlarged view showing the surface of nozzles for the recording head 51. In the drawing, the surface of a nozzle for a reaction solution is indicated by 51b, and a nozzle 21 for ejecting the reaction solution is provided in the longitudinal direction. On the other hand, the surface of nozzles for the ink composition is indicated by 51c, and a yellow ink composition, a magenta ink composition, a cyan ink composition, and a black ink composition are ejected respectively through nozzles 22, 23, 24 and 25.

Figure 7:
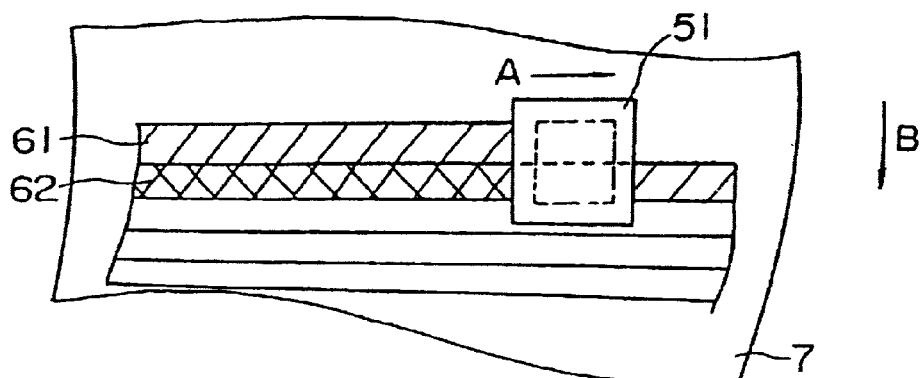
FIG. 7 is a diagram illustrating ink jet recording using the recording head shown in FIG. 6, wherein numeral 61 designates a region where a reaction solution has been deposited and numeral 62 a printed region where an ink composition has been printed on the deposited reaction solution.

Further, an ink jet recording method using the recording head shown in FIG. 6 will be described with reference to FIG. 7. The recording head 51 is moved in the direction indicated by an arrow A, during which time the reaction solution is ejected through the nozzle surface 51b to form a reaction solution-deposited region 61 in a band form on the paper 7. Subsequently, the paper 7 is transferred by a predetermined extent in the paper feed direction indicated by an arrow B, during which time the recording head 51 is moved in the direction opposite to that indicated by the arrow A in the drawing and returned to the left end of the paper 7, and the recording head 51 conducts printing using the ink composition on the reaction solution-deposited region, thereby forming a print region 62.

Figure 8:
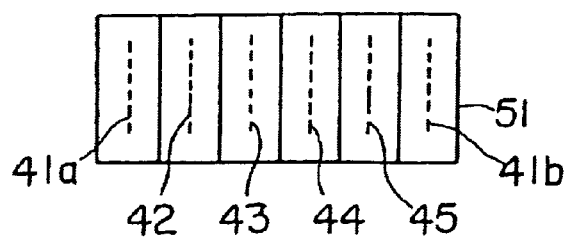
FIG. 8 is a diagram showing another embodiment of the recording head, wherein all ejection nozzles are arranged in lateral direction.

Further, as shown in FIG. 8, in the recording head 51, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. When the recording head 51 is moved in a direction indicated by an arrow A, the reaction solution is ejected through the nozzle 41b and deposited onto the recording medium and a predetermined ink(s) among inks ejected from the nozzles 42 to 45 is ejected and deposited on the same portion. On the other hand, when the recording head 51 is returned to a direction opposite to the direction indicated by the arrow A, the reaction solution is ejected through the nozzle 41a and deposited onto the reaction medium and a predetermined ink(s) among inks ejected from the nozzles 42 to 45 is ejected and deposited on the same portion. In the recording head according to this embodiment, the recording head 51, when reciprocated on the carriage, can conduct printing in both directions. Therefore, in this case, printing at a higher speed is expected as compared with the case where the recording head shown in FIG. 7 is used.

Figure 9:
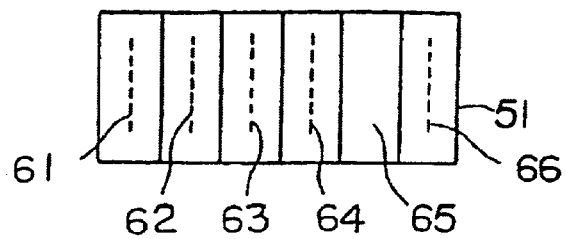
FIG. 9 is a diagram showing still another embodiment of the recording head, wherein a buffer zone 65 for preventing an ink composition from coming into contact with a reaction solution on the surface of the nozzles is provided between ejection nozzles 61, 62, 63, and 64 for the ink composition and an ejection nozzle 66 for the reaction solution.

Further, like the recording head 1 described in FIG. 9, preferably, a buffer zone can be provided between the ejection nozzle of the reaction solution and the ejection nozzle of the ink composition to prevent contact between the reaction solution and the ink composition on the surface of nozzles. In the drawings, numerals 61, 62, 63, and 64 designate an ejection nozzle for a yellow ink composition, an ejection nozzle for a magenta ink composition, an ejection nozzle for a cyan ink composition, and an ejection nozzle for a black ink composition, respectively, numeral 66 an ejection nozzle for a reaction solution, and numeral 65 a buffer zone provided for avoiding contact between the reaction solution and the ink composition.

In the ink jet recording apparatus, the supplement of the ink composition may be carried out by replacing an ink tank in a cartridge form. The ink tank may be integral with the recording head.

Figure 10:
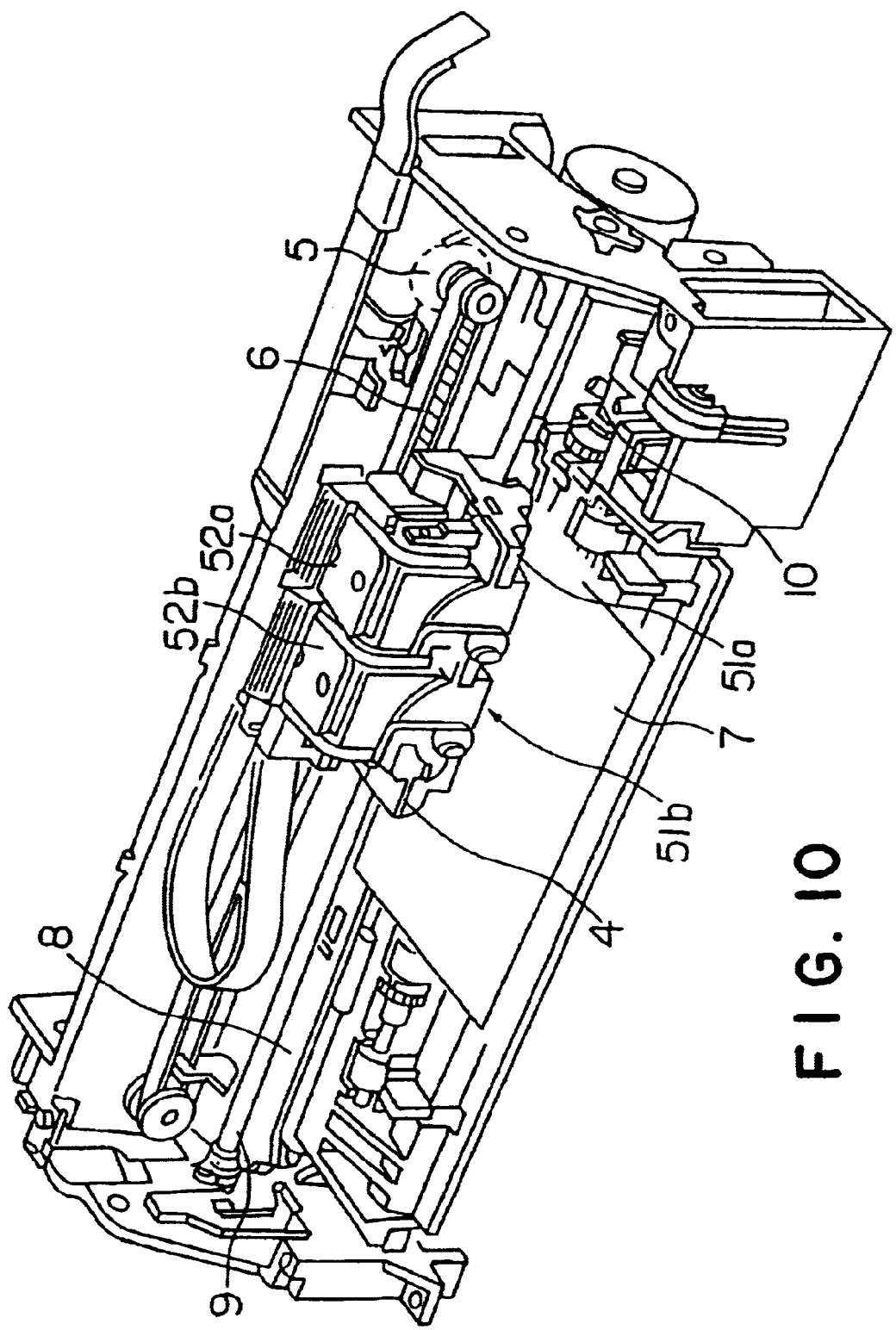
FIG. 10 is a diagram showing an ink jet recording apparatus usable in practicing the method according to the present invention, wherein a recording head is integral with an ink tank.

A preferred embodiment of an ink jet recording apparatus using such an ink tank is shown in FIG. 10. In the drawing, the same members as used in the apparatus shown in FIG. 1 have the same reference numerals. In the embodiment shown in FIG. 10, recording heads 51a and 51b are integral respectively with ink tanks 52a and 52b. An ink composition and a reaction solution are ejected respectively through the recording heads 51a and 51b. Basically, printing may be conducted in the same manner as described above in connection with the apparatus shown in FIG. 5. Further, in this embodiment, the recording head 51a is moved together with the ink tank 52a on a carriage 4, while the recording head 51a is moved together with the ink tank 52b on the carriage 4.

EXAMPLES

The following examples further illustrate the present invention but are not intended to limit it.

Production of Fine Particles of Polymer 1

To a flask equipped with an agitator, a thermometer, a reflux condenser, and a dropping funnel are added 100 ml of distilled water and 0.1 g of potassium persulfate. The internal temperature of the flask was raised to 70° C. while purging with nitrogen under agitation. Separately, 100 ml of distilled water, 1.0 g of sodium dodecylbenzenesulfonate, 30 g of styrene, 40 g of n-lauryl methacrylate, 5 g of methacrylic acid, and 10 g of methacrolylacetone (prepared according to Makromol. Chem., 29, 151 (1959)) were mixed and agitated together to prepare an emulsification product. The emulsification product was gradually added dropwise to the flask through a dropping funnel. The resultant emulsion was cooled to room temperature, and the cooled emulsion was filtered through a 0.4-$\mu$m filter and adjusted to a concentration of the fine particles of the polymer to 30% by the addition of distilled water. The emulsion thus prepared had a minimum film-forming temperature of 20° C.

Preparation of Inks

Black inks listed in the following table were prepared by the following methods.

TABLE 1

|  | Black ink 1 | Black ink 2 | Black ink 3 |
|---|---|---|---|
| Carbon black MA7 | 5 | 5 | 5 |
| Styrene/acrylic acid copolymer (dispersant) | 1 | 1 | 1 |
| Fine particles of polymer 1 | 3 | 3 | 3 |
| Glycerin | 15 | 15 | 15 |
| 2-Pyrrolidone | — | — | 2 |
| Maltitol | — | 7 | 6.3 |
| Sucrose | — | — | 0.7 |
| Potassium hydroxide | — | — | 0.1 |
| Triethanolamine | — | — | 0.9 |
| Ethyl alcohol | — | — | 2 |
| Pure water | Balance | Balance | Balance |

TABLE 2

|  | Black ink 4 | Black ink 5 |
|---|---|---|
| Carbon black MA7 | — | 5 |
| Carbon black Raven 1080 | 5 | — |
| Styrene/acrylic acid copolymer (dispersant) | 1 | 1 |
| Microgel E-5002 | — | 3.5 |
| Glycerin | 10 | 10 |
| 2-Pyrrolidone | 2 | 2 |
| Maltitol | — | 6.3 |
| Sucrose | — | 0.7 |
| Ethyl alcohol | — | 4 |
| Pure water | Balance | Balance |

Black Ink 1

Carbon black MA7 (manufactured by Mitsubishi Chemical Corp.), the dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, an aqueous polymer emulsion of 10% by weight of the fine particles of polymer 1 in dispersed water (concentration of the fine particles of the polymer: 3% by weight) and glycerin were added to ion-exchanged water. The mixture was agitated at room temperature for 20 min. The carbon black dispersion was gradually added dropwise to the mixture with agitation, followed by agitation for additional 20 min. The mixture was then filtered through a 5 µm membrane filter to prepare an ink jet recording ink.

Black Ink 2

Carbon black MA7, the dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, an aqueous polymer emulsion of 10% by weight of the fine particles of polymer 1 in dispersed water (concentration of the fine particles of the polymer: 3% by weight), glycerin, and maltitol were added to ion-exchanged water. The mixture was agitated at room temperature for 20 min. The carbon black dispersion was gradually added dropwise to the mixture with agitation, followed by agitation for additional 20 min. The mixture was then filtered through a 5 µm membrane filter to prepare an ink jet recording ink.

Black Ink 3

Carbon black MA7, the dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, an aqueous polymer emulsion of 10% by weight of the fine particles of polymer 1 dispersed in water (concentration of the fine particles of the polymer: 3% by weight), glycerin, 2-pyrrolidone, maltitol, sucrose, potassium hydroxide, triethanolamine, and ethyl alcohol were added to ion-exchanged water. The mixture was agitated at room temperature for 20 min. The carbon black dispersion was gradually added dropwise to the mixture with agitation, followed by agitation for additional 20 min. The mixture was then filtered through a 5 µm membrane filter to prepare an ink jet recording ink.

Black Ink 4

Carbon black Raven 1080 (manufactured by Columbian Carbon Co., Ltd.), the dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, glycerin and 2-pyrrolidone were added to water, and the mixture was agitated at room temperature for 20 min. The carbon black dispersion was gradually added dropwise to the mixture with agitation, followed by agitation for additional 20 min. The mixture was then filtered through a 5 µm membrane filter to prepare an ink jet recording ink.

Black Ink 5

Carbon black MA7, the dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, a styrene-acrylic resin emulsion Microgel E-5002 having a minimum film-forming temperature of about 80° C. (an aqueous emulsion of a styrene/acryl copolymer, minimum film-forming temperature: about 80° C., manufactured by Nippon Paint Co., Ltd.), glycerin, 2-pyrrolidone, maltitol, sucrose, and ethyl alcohol were added to ion-exchanged water, and the mixture was agitated at room temperature for 20 min. The carbon black dispersion was gradually added dropwise to the mixture with agitation, followed by agitation for additional 20 min. The mixture was then filtered through a 5 µm membrane filter to prepare an ink jet recording ink.

Ink Evaluation Test

Evaluation 1: Clogging

An ink was filled into an ink jet printer MJ-700V2C (manufactured by Seiko Epson Corporation), and alphanumeric characters were continuously printed for 10 min. The printer was then stopped and allowed to stand without capping under an environment of temperature 40° C. and humidity 25% for one week. Thereafter, alphanumeric characters were printed again to determine the number of cleaning operations necessary for offering the same print quality as that before the standing. The results were evaluated according to the following criteria.

A: 0 to twice

B: 3 to 5 times

C: Not less than 6 times

The results of evaluation are summarized in the following table.

Evaluation 2: Storage Stability

The ink (50 cc) was placed in a glass bottle, and the bottle was hermetically sealed and allowed to stand at 60° C. for two weeks or four weeks. At the end of the period, the ink was visually inspected for a change in viscosity and creation of sediment. The results were evaluated according to the following criteria.

A: Neither creation of sediment nor change in viscosity

B: Creation of no sediment with the viscosity being changed by not more than 1.0 cps C: Creation of no sediment with the viscosity being changed by more than 1.0 cps D: Creation of sediment The results were as summarized in the following table.

Evaluation 3: Rubbing (Scratch) Resistance (Line Marking Resistance)

The following ink evaluation tests were carried out for the black inks 1 to 5 prepared above. Printing was carried out as follows. Specifically, letters were printed using an ink jet printer MJ-700V2C (manufactured by Seiko Epson Corporation) under conditions of an amount of the ink ejected per dot of 0.07 µg and a density of 360 dpi. Papers used for the tests were as follows.

(1) Xerox P Paper (Xerox Corp.)

(2) Ricopy 6200 Paper (Ricoh Co. Ltd.)

(3) Xerox 4024 Paper (Xerox Corp.)

(4) Neenah Bond Paper (Kimberly-Clark)

(5) Xerox R Paper (Xerox Corp., recycled paper)

(6) Yamayuri Paper (Honshu Paper Co., Ltd., recycled paper)

The print was air dried for 24 hr, and the printed letters were rubbed with a water-base yellow fluorescent marker pen (ZEBRA PEN 2 (trademark)) manufactured by ZEBRA at a marking force of $4.9 \times 10^5$ N/m$^2$, and the degree of stain in the yellow area was visually inspected. The results were evaluated according to the following criteria.

A: No stain created by marking three times

B: No stain created by marking twice with some paper being stained by marking three times C: No stain created by marking once with some paper being stained by marking twice D: Some paper stained by marking once The results are summarized in the following table.

Evaluation 4: Waterfastness

A water droplet was dropped on the printed area of the print obtained in the evaluation 3, and the state of the print was visually inspected. The results were evaluated according to the following criteria.

A: No change in printed area on which water droplet has been dropped thereon

B: Creation of mark (water mark) around printed area on which water droplet has been dropped thereon C: Blurring around printed area on which water droplet has been dropped thereon The results are summarized in the following table.

TABLE 3

|  | Evaluation 1 | Evaluation 2 | | Evaluation 3 | Evaluation 4 |
|---|---|---|---|---|---|
|  |  | 2 Weeks | 4 Weeks |  |  |
| Black ink 1 | A | A | D | A | A |
| Black ink 2 | A | A | D | A | A |
| Black ink 3 | A | A | D | A | A |
| Black ink 4 | C | D | D | D | C |
| Black ink 5 | A | A | A | C | — |

Preparation of Color Inks

The color inks listed in the following table were prepared by the following methods.

TABLE 4

|  | Color ink set 1 | | |
|---|---|---|---|
|  | Cyan ink | Magenta ink | Yellow ink |
| KETBLUE EX-1 (cyan pigment) | 2 | — | — |
| KETRED 309 (magenta pigment) | — | 2 | — |
| KETYELLOW 403 (yellow pigment) | — | — | 2 |
| Styrene/acrylic acid copolymer (dispersant) | 1 | 1 | 1 |
| Fine particles of polymer 1 | 3 | 3 | 3 |
| Glycerin | 10 | 10 | 10 |
| 2-Pyrrolidone | 2 | 2 | 2 |
| Maltitol | 6.3 | 6.3 | 6.3 |
| Sucrose | 0.7 | 0.7 | 0.7 |
| Ethyl alcohol | 4 | 4 | 4 |
| Pure water | Balance | Balance | Balance |

Color Ink Set

Cyan Ink

Cyan pigment KETBLUE EX-1 (manufactured by Dainippon Ink and Chemicals, Inc.), the dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a cyan pigment dispersion. Separately, an aqueous polymer emulsion of 10% by weight of the fine particles of polymer 1 in water (concentration of the fine particles of the polymer: 3% by weight), glycerin, 2-pyrrolidone, maltitol, sucrose, and ethyl alcohol were added to ion-exchanged water, and the mixture was agitated at room temperature for 20 min. The pigment dispersion was gradually added dropwise to the mixture with agitation, followed by agitation for additional 20 min. The mixture was then filtered through a 5 μm membrane filter to prepare an ink jet recording ink.

Magenta ink

A magenta ink was prepared in the same manner as described above in connection with preparation of cyan ink 1, except that magenta pigment KETRED 309 (manufactured by Dainippon Ink and Chemicals, Inc.) was used as the pigment.

Yellow ink

A yellow ink was prepared in the same manner as described above in connection with the preparation of cyan ink 1, except that yellow pigment KETYELLOW 403 (manufactured by Dainippon Ink and Chemicals, Inc.) was used as the pigment.

Preparation of Reaction Solution

The following ingredients were mixed together to prepare reaction solutions.

| Reaction solution 1 | |
|---|---|
| Magnesium nitrate hexahydrate | 25 wt % |
| Triethylene glycol monobutyl ether | 10 wt % |
| Glycerin | 20 wt % |
| Ammonia | 0.5 wt % |
| Pure water | Balance |
| Reaction solution 2 | |
| PAA-L (20% aqueous solution of polyallylamine represented by formula (a), molecular weight about 10,000, manufactured by Nitto Boseki Co., Ltd.) | 5 wt % |
| Triethylene glycol monobutyl ether | 10 wt % |
| Glycerin | 20 wt % |
| Pure water | Balance |

Evaluation 5: Print quality (feathering)

An ink jet recording apparatus shown in FIG. 5 was used to perform printing using the reaction solution 1 or 2 and the black inks 1 t 5 on the following various papers. In the printing, the reaction solution was first printed (100% duty), and 24 alphabetical characters were printed using the black ink. For both the reaction solution and the ink, the ejection rate was 0.07 μg/dot, and the density was 360 dpi.

The following recording papers were used for the evaluation.

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (Xerox Corp., recycled paper)
(6) Yamayuri paper (recycled paper, manufactured by Honshu Paper Co., Ltd., The number of featherings was counted for 24 printed alphabetical characters printed by the above method. The results were classified and evaluated according to the following criteria.

A: Number of featherings less than 100
B: Number of featherings 100 to 250
C: Number of featherings 250 to 350
D: Number of featherings 350 to 500
E: Number of featherings 500 to 1000
F: Number of featherings not less than 1000

The results are summarized in Table 5.

Evaluation 6: Rubbing (Scratch) Resistance (Line Marking Resistance)

A test was carried out in the same manner as described above in connection with the evaluation 3, except that the prints obtained in the evaluation 5 were used. The evaluation results are summarized in Table 5.

Evaluation 7: OD Value

An ink jet recording apparatus shown in FIG. 5 was used to perform printing using the reaction solution 1 or 2 and the black inks 1 to 5 on the following various papers. In the printing, blotted images were printed. Specifically, the reaction solution was first printed (100% duty), and the black ink was then printed (100% duty). For both the reaction solution and the ink, the ejection rate was 0.07 μg/dot, and the density was 360 dpi. The reflection OD value of the print in its blotted area was measured with Macbeth TR927 (manufactured by Macbeth).

The results are summarized in Table 5.

Evaluation 8: Uneven Printing

An ink jet recording apparatus shown in FIG. 5 was used to perform printing (100% duty) on the following various papers in the same printing method as described above in connection with the evaluation 1.

Ricopy 6200 Paper (Ricoh Co. Ltd.)

Canon dry (Canon Inc.)

For the printed image, the reflection OD value was measured with Macbeth PCMII (manufactured by Macbeth). In this case, the OD value was measured for five randomly selected points of the printed area, and the average OD value was determined. This procedure was repeated five times. The maximum and minimum OD average values were determined from the five average values. When this difference is less than 0.5, no practical problem is posed, with a difference of less than 0.4 being preferred.

A: Difference less than 0.3

B: Difference 0.3 to less than 0.4

C: Difference not less than 0.4

The results are summarized in Table 5.

Evaluation 9: Waterfastness

An ink jet recording apparatus shown in FIG. 5 was used to perform printing on a specialty gloss film for an ink jet printer MJ-700V2C (manufactured by Seiko Epson Corporation). A water droplet was dropped on the printed area of the print, and the state of the print was visually inspected. The results were evaluated according to the following criteria.

A: No change in printed area on which water droplet has been dropped thereon

B: Creation of mark (water mark) around printed area on which water droplet has been dropped thereon C: Blurring or lifting around printed area on which water droplet has been dropped thereon The results are summarized in Table 5.

TABLE 5

| Ink | Reaction Solution | Evaluation 5 | Evaluation 6 | Evaluation 7 | Evaluation 8 | Evaluation 9 |
|---|---|---|---|---|---|---|
| Black ink 1 | Reaction solution 1 | A | A | 1.60 | A | A |
| Black ink 1 | Reaction solution 2 | B | A | 1.60 | A | A |
| Black ink 2 | Reaction solution 1 | A | A | 1.60 | A | A |

TABLE 5-continued

| Ink | Reaction Solution | Evaluation 5 | Evaluation 6 | Evaluation 7 | Evaluation 8 | Evaluation 9 |
|---|---|---|---|---|---|---|
| Black ink 3 | Reaction solution 1 | A | A | 1.63 | A | A |
| Black ink 4 | Reaction solution 1 | F | D | 1.25 | C | C |
| Black ink 5 | Reaction solution 1 | D | C | 1.42 | — | — |

Evaluation 10: Color Bleeding

An ink jet printer MJ-700V2C (manufactured by Seiko Epson Corporation) was used to deposit a reaction solution on the above recording papers (100% duty), and color inks (cyan, magenta, and yellow) (100% duty) and the black ink (a letter) were simultaneously printed to visually examine the prints for the presence of uneven color-to-color mixing in the letter boundaries. The results are summarized according to the following criteria.

A: No color-to-color mixing observed with clear letter boundaries

B: Feather-like color-to-color mixing observed

NG: Significant color-to-color mixing observed rendering the outline of the letter blurry The results are summarized in Table 6.

TABLE 6

| | | | Evaluation 10 |
|---|---|---|---|
| Color ink set 1 | Black ink 1 | Reaction solution 1 | A |

Production of Fine Particles 2 of Polymer

The fine particles 2 of a polymer was produced according the method described in Makromol. Chem., 193, 151 (1992)).

Specifically, 20 g of p-hydroxyacetophenone was heated at 120° C. in propionic anhydride for one hr. The resultant solution was cooled on an ice bath. About 5 hr after the initiation of the solution, the viscosity of the solution increased. At this point, dry boron trifluoride was quickly passed.

The system was allowed to stand at 0° C. for 2 hr, 500 ml of a 1 M aqueous sodium acetate solution was then added, followed by reflux for one hr. Thereafter, the system was allowed to stand for 24 hr, and an organic product was then separated. The water-soluble product was neutralized with 100 g of sodium bicarbonate and then extracted with 500 ml of ether, followed by washing with 300 ml of water. The ether extract was extracted with 500 ml of a 1.5 M sodium hydroxide solution, and the alkali extract was neutralized with concentrated hydrochloric acid. The neutralized extract as an oil was cooled in a freezer for 2 hr to solidify the oil. The crude product this obtained purified by sublimation, and the purified product was then dissolved in benzene and recrystallized to give 1-(4-hydroxyphenyl)-1,3-pentanedione.

A mixture of 4.93 g of 1-(4-hydroxyphenyl)-1,3-pentanedione with 7.50 g of 4-(6-acryloyloxyhexyloxy) benzoic acid and 6.86 g of N,N'-dicyclohexylcarbodiimide was agitated in 20 ml of ethyl acetate at 0° C. for one hr and then agitated at room temperature for 24 hr. The insoluble N,N'-dicyclohexyl urea was filtered off, and the filtered product was distilled to give 4-(1,3-dioxypentyl)phenyl-4-(6-acryloyloxyhexyloxy)benzoate.

To a flask equipped with an agitator, a thermometer, a reflux condenser, and a dropping funnel are added 100 ml of distilled water and 0.1 g of potassium persulfate. The internal temperature of the flask was raised to 70° C. while purging with nitrogen under agitation. Separately, 100 ml of distilled water, 1.0 g of sodium dodecylbenzenesulfonate, 30 g of styrene, 55 g of 2-ethylhexyl acrylate, 5 g of methacrylic acid, and 10 g of 4-(1,3-dioxypentyl)phenyl-4-(6-acryloyloxyhexyloxy)benzoate were mixed and agitated together to prepare an emulsification product. The mixture was gradually added dropwise to the flask through a dropping funnel. The resultant emulsion was cooled to room temperature, and the cooled emulsion was filtered through a 0.4-μm filter and adjusted to a concentration of the fine particles of the polymer to 30% by the addition of distilled water. The emulsion thus prepared had a minimum film-forming temperature of 20° C.

Black Ink 11

Carbon black MA7 (manufactured by Mitsubishi Kasei Corp.) (5% by weight), 1% by weight of a styrene/acrylic acid copolymer dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, 0.1% by weight of ethylenediaminetetraacetic acid was dissolved in ion-exchanged water, 15% by weight of glycerin was added thereto, and the solution was agitated at room temperature for 20 min. This solution was then gradually added dropwise to the above carbon black dispersion while agitating by means of a dispergator, followed by thorough agitation. Further, 10% by weight of an aqueous polymer emulsion of the fine particles of the polymer 2 dispersed in water (concentration of fine particles of polymer: 3% by weight) was gradually added dropwise to the solution while agitating, and the mixture was thoroughly agitated at room temperature and filtered through a 5-μm membrane filter to prepare an ink composition.

Black Ink 12

Carbon black MA7 (manufactured by Mitsubishi Chemical Corp.) (5% by weight), 1% by weight of a styrene/acrylic acid copolymer dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, 0.1% by weight of ethylenediaminetetraacetic acid was dissolved in ion-exchanged water, 15% by weight of glycerin and 7% by weight of maltitol was added thereto, and the solution was agitated at room temperature for 20 min. This solution was then gradually added dropwise to the above carbon black dispersion while agitating by means of a dispergator, followed by thorough agitation. Further, 10% by weight of an aqueous polymer emulsion of the fine partilces 2 dispersed in water (concentration of fine particles of polymer: 3% by weight) was gradually added dropwise to the solution while agitating, and the mixture was thoroughly agitated at room temperature and filtered through a 5-μm membrane filter to prepare an ink composition.

Black Ink 13

Carbon black MA7 (manufactured by Mitsubishi Chemical Corp.) (5% by weight), 1% by weight of a styrene/acrylic acid copolymer dispersant, and ion-exchanged water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a carbon black dispersion. Separately, 0.1% by weight of ethylenediaminetetraacetic acid was dissolved in ion-exchanged water, 15% by weight of glycerin, 2% by weight of 2-pyrrolidone, 6.3% by weight of maltitol, 0.7% by weight of sucrose, 0.1% by weight of potassium hydroxide, 0.9% by weight of triethanolamine, and 2% by weight of ethyl alcohol were added to the solution, and the solution was agitated at room temperature for 20 min. This solution was then gradually added dropwise to the above carbon black dispersion while agitating by means of a dispergator, followed by thorough agitation. Further, 10% by weight of an aqueous polymer emulsion of the fine particles of the polymer 2 dispersed in water (concentration of fine particles of polymer: 3% by weight) was gradually added dropwise to the solution while agitating, and the mixture was thoroughly agitated at room temperature and filtered through a 5-μm membrane filter to prepare an ink composition.

Ink Evaluation Test

The above evaluation tests 1, 2, and 3 were carried out for the above ink compositions. The results are summarized in the following table.

TABLE 7

|  | Evaluation 1 | Evaluation 2 | | Evaluation 3 |
|---|---|---|---|---|
|  |  | 2 Weeks | 4 Weeks |  |
| Black ink 11 | A | A | A | A |
| Black ink 12 | A | A | A | A |
| Black ink 13 | A | A | A | A |

Printing using two liquids, a combination of the above ink composition with the above reaction solution, was carried out, and the prints were evaluated by the evaluation tests 5 and 6. The results are summarized in the following table.

TABLE 8

|  | Evaluation 5 | Evaluation 6 |
|---|---|---|
| Black ink 11 | A | A |
| Black ink 12 | A | A |
| Black ink 13 | A | A |

What is claimed is:

1. An ink composition comprising a dye, water, a water-soluble organic solvent, a water-soluble sequestering agent, and fine particles of a polymer, the polymer having a ligand structure that, upon deposition onto a recording medium comprising a metal ion, combines with the metal ion to form a chelate and, upon the formation of the chelate, forms an agglomerate, the water-soluble sequestering agent inhibiting formation of an agglomerate in the ink composition prior to said deposition, wherein the ligand structure is represented by the following formula:

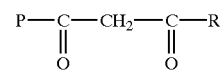

wherein P represents a polymer structure moiety and R represents an alkyl or aryl group.

2. The ink composition according to claim 1, wherein the polymer has a film-forming property.

3. The ink composition according to claim 1, wherein the polymer has a minimum film-forming temperature of 30° C. or below.

4. The ink composition according to claim 3, wherein the water-soluble organic solvent has a boiling point of 180° C. or above.

5. The ink composition according to claim 1, wherein the polymer comprises a thermoplastic polymer.

6. The ink composition according to claim 5, wherein the thermoplastic polymer is selected from the group consisting of a poly(meth)acrylic ester, polystyrene, a (meth)acrylic ester/styrene copolymer, polyvinyl acetate, ethylene/vinyl acetate copolymer, an ethylene/(meth)acrylic ester copolymer, polybutadiene, polyisoprene, polyvinyl chloride, polyvinylidene chloride, poly($\alpha$-methylstyrene), a styrene/butadiene copolymer, a (meth)acrylic acid/styrene copolymer, a styrene/maleic acid copolymer, a styrene/itaconic acid copolymer, a styrene/maleic ester copolymer, a styrene/itaconic acid copolymer, a polyester, polyurethane, polysiloxane, and a polyamide.

7. The ink composition according to claim 1, wherein the fine particle of the polymer has a homogeneous structure.

8. The ink composition according to claim 7, wherein the fine particle has a functional group selected from the group consisting of carboxyl, sulfonic acid, amide, amino, and hydroxyl groups.

9. The ink composition according to claim 1, wherein the fine particle has a core/shell structure comprising a core surrounded by a shell.

10. The ink composition according to claim 9, wherein the shell has a functional group selected from the group consisting of carboxyl, sulfonic acid, amide, amino, and hydroxyl groups.

11. The ink composition according to claim 9, wherein the fine particle has a functional group selected from the group consisting of carboxyl, sulfonic acid, amide, amino, and hydroxyl groups.

12. The ink composition according to claim 1, wherein the fine particle of the polymer has a diameter of not more than 0.4 $\mu$m.

13. The ink composition according to claim 1, wherein the water-soluble sequestering agent is an aminocarboxylic acid derivative or a condensed phosphoric acid.

14. The ink composition according to claim 13, wherein the water-soluble sequestering agent is selected from the group consisting of ethylenediaminetetraacetic acid, iminodiacetic acid, nitriloacetic acid, diethylenetriaminepentaacetic acid, triethylenetetraminehexaacetic acid, cyclohexane-1,2-diaminetetraacetic acid, N-hydroxyethylethylenediaminetriacetic acid, ethylene glycol diethyl etheraminetetraacetic acid, ethylenediaminetetrapropionic acid, pyrophosphoric acid, and triphosphoric acid.

15. A recording method comprising the step of depositing an ink composition onto a recording medium to perform printing on the recording medium, wherein the ink composition is one according to claim 1.

16. An ink jet recording method comprising the steps of: ejecting droplets of an ink composition; and depositing the ink droplets onto a recording medium to perform printing on the recording medium, wherein the ink composition is one according to claim 1.

17. A recording method comprising the step of depositing the ink composition according to claim 1 and a reactant-containing reaction solution, capable of forming an agglomerate upon contact with the ink composition, to form an image.

18. The recording method according to claim 7, wherein the ink composition and/or the reaction solution are deposited onto a recording medium by ink jet recording.

19. The recording method according to claim 18, wherein the reaction solution comprises at least a reactant, a water-soluble organic solvent, and water.

20. The recording method according to claim 19, wherein the reactant is a polyvalent metal salt or a polyallylamine or a derivative thereof.

21. A recording method comprising the step of depositing the ink composition according to claim 1 onto a recording medium previously coated with a reactant capable of forming an agglomerate upon contact with the ink composition.

22. The recording method according to claim 21, wherein the reactant is a water-soluble polyvalent metal salt.

23. The recording method according to claim 22, wherein the ink composition is deposited onto the recording medium by ink jet recording.

24. An ink composition comprising water, a dye, a water-soluble organic solvent in an amount of about 0.1 to 30% by weight, a water-soluble sequestering agent in an amount of about 0.0001 to 5% by weight, and fine particles of a polymer in an amount of about 1 to 10% by weight, the polymer having a film forming property and a ligand structure that combines with a metal ion to form a chelate and, upon the formation of the chelate, forms a agglomerate, wherein the ligand structure is represented by the following formula:

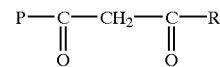

wherein P represents a polymer structure moiety and R represents an alkyl or aryl group.

25. The ink composition according to claim 24, wherein the dye is selected from the group consisting of direct dyes, acid dyes, foodstuff dyes, basic dyes, reactive dyes, disperse dyes, vat dyes, soluble vat dyes, and reactive disperse dyes.

* * * * *